(12) United States Patent
Yamada (10) Patent No.: US 6,441,926 B1
(45) Date of Patent: Aug. 27, 2002

(54) FACSIMILE MACHINE AND TCF RECEPTION METHOD FOR FACSIMILE MACHINE

(75) Inventor: Shinichi Yamada, Tokyo (JP)

(73) Assignee: NEC Corp. (JP)

( * ) Notice: Subject to any disclaimer, the term of this patent is extended or adjusted under 35 U.S.C. 154(b) by 0 days.

(21) Appl. No.: 09/275,606

(22) Filed: Mar. 24, 1999

(30) Foreign Application Priority Data

Mar. 24, 1998 (JP) .......................................... 10-075650

(51) Int. Cl.[7] .......................... H04N 1/32; H04M 11/00

(52) U.S. Cl. .................................. 358/442; 379/100.17

(58) Field of Search ................................ 358/442, 400, 358/434; 379/100.17

(56) References Cited

U.S. PATENT DOCUMENTS 5,835,579 A * 11/1998 Gersi et al. ............ 379/100.17

FOREIGN PATENT DOCUMENTS

JP  10-70589  3/1998

OTHER PUBLICATIONS

Japanese Office Action issued Jan. 30, 2001 in a related application with English–language translation of relevant portions.

Masataka Ogoshi, Mamoru Kobayashi and Masayoshi Nakayama: "An Examination of the System Involving a Plurality of Transponders in the Multimedia Satellite Communications System," A Collection of Lectures Delivered at the 1997 Annual Convention of the Society of Electronic Information and Communications, Mar. 6, 1997, p. 282.

* cited by examiner

Primary Examiner—Kimberly A. Williams
(74) Attorney, Agent, or Firm—Dickstein, Shapiro, Morin & Oshinsky, LLP (57) ABSTRACT

A facsimile machine comprises a fax/modem section for communicating signals with a communication line in order to sending and receiving a fax and a computer unit for outputting AT commands such as a DCS reception command for requesting reception of a DCS (Digital Command Signal) and a TCF reception command for requesting reception of a TCF (Training Check Field) to the fax/modem section. The fax/modem section immediately changes into a TCF reception state for receiving a TCF if the fax/modem section received a DCS. In the TCF reception state, the fax/modem section receives the TCF sent via the communication line and temporarily stores the TCF in a TCF buffer, regardless of whether or not the fax/modem section has already received the TCF reception command from the computer unit. The fax/modem section sends the TCF in the TCF buffer to the computer unit when the fax/modem section received the TCF reception command from the computer unit. By the operation of the facsimile machine, communication with a sender facsimile machine can be established with reliability even if a switching time of the sender facsimile machine between an HDLC frame and the following TCF is very short, and thus communication reliability between facsimile machines can be improved.

22 Claims, 7 Drawing Sheets

| INPUT AT COMMAND | RESPONSE AT COMMAND |
|---|---|
| 301 — AT+FRH=3 | |
| | CONNECT — 305 |
| | <DCS FRAME> |
| | OK — 307 |
| 303 — AT+FRM=96 | |
| | CONNECT — 309 |
| | <TCF DATA> |
| | NO CARRIER — 311 |

FACSIMILE MACHINE AND TCF RECEPTION METHOD FOR FACSIMILE MACHINE

BACKGROUND OF THE INVENTION

The present invention relates to a facsimile machine and a TCF (Training Check Field) reception method for a facsimile machine, and in particular, to a facsimile machine and a TCF reception method for a facsimile machine which utilize EIA 578 facsimile control commands (AT commands) and which operate according to timing defined in ITU-T T.30.

DESCRIPTION OF THE PRIOR ART

Among various types of information communication means provided today, information communication by facsimile has a strong point in that text, characters, images or whatever on a sheet can be transmitted easily and directly, and facsimile machines have come into wide use in many countries.

A facsimile machine generally comprises a fax/modem section as the interface of the facsimile machine to a public network circuit such as a public switched telephone network and a computer unit etc. for executing processing of data (received data or data to be transmitted) and outputting AT commands to the fax/modem section.

In the following, an example of a conventional facsimile machine and a conventional TCF reception method for a facsimile machine will be described referring to FIG. 1 through FIG. 4. Incidentally, FIG. 2 through FIG. 4 will also be used later for explaining a facsimile machine and a TCF reception method for a facsimile machine in accordance with the present invention.

Figure 2:
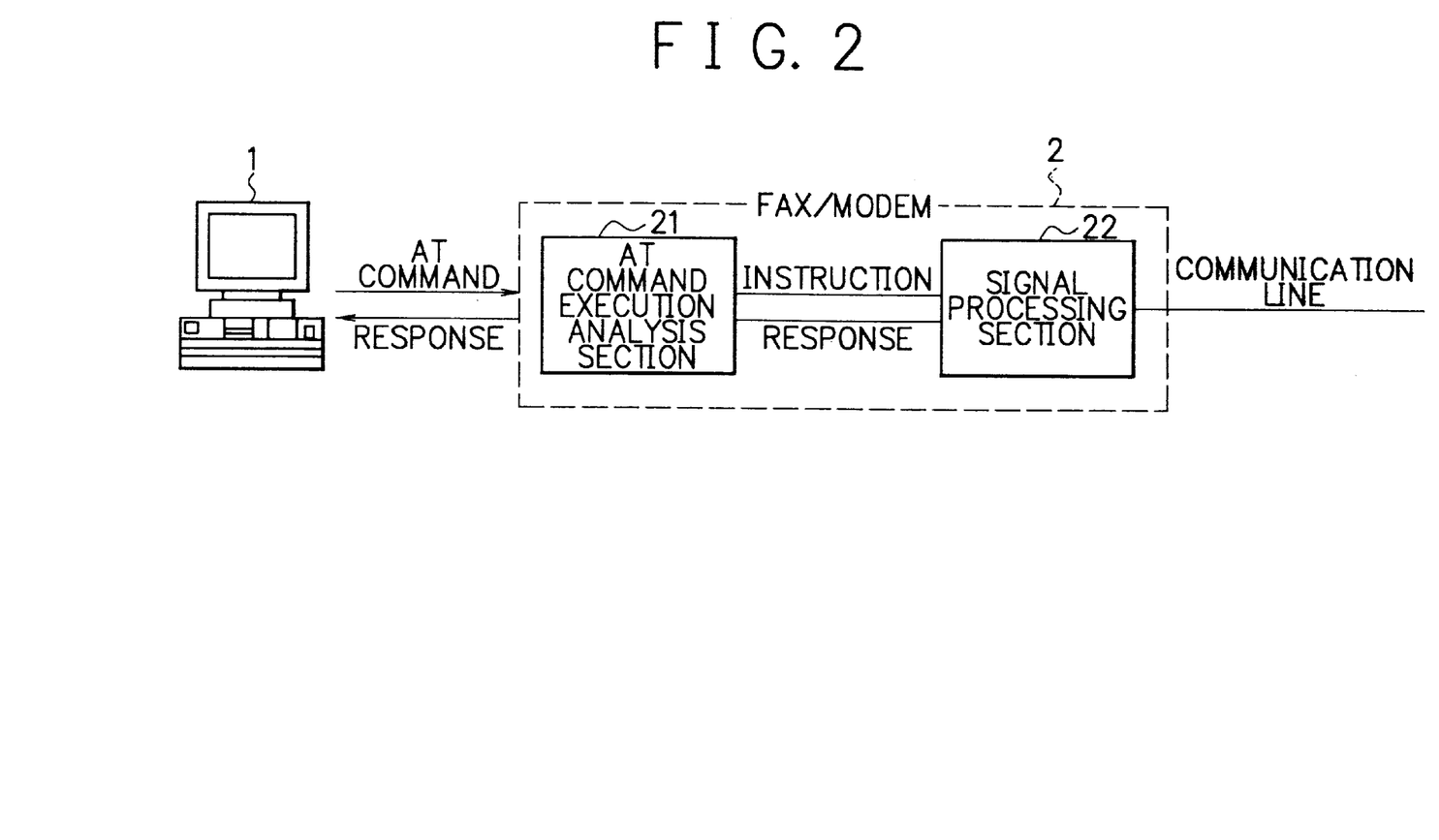
FIG. 2 is a schematic block diagram showing a facsimile machine according to an embodiment of the present invention.

Referring to FIG. 2, the conventional facsimile machine is composed of a computer unit 1 which operates according to control of a program and outputs AT commands, and a fax/modem 2 which is connected to a communication line. The fax/modem 2 includes an AT command execution analysis section 21 and a signal processing section 22. The AT command execution analysis section 21 and the signal processing section 22 are realized by, for example, one or more microprocessor units which are composed of one or more CPUs (Central Processing Units), ROM (Read Only Memory), RAM (Random Access Memory), etc.

Incidentally, while the computer unit 1 and the fax/modem 2 are provided apart in FIG. 2, of course, the computer unit 1 and the fax/modem 2 can also be installed in one body as an integral-type facsimile machine. In addition, while the hardware fax/modem 2 is employed as the fax/modem section of the facsimile machine in FIG. 2, the fax/modem section is not limited to such a hardware fax/modem section and it is also possible to realize the fax/modem 2 by software that is installed on a computer (for example, the computer unit 1) and executed by a CPU of the computer.

In the following, the operation of the components of the conventional facsimile machine shown in FIG. 2 will be explained.

The computer unit 1 sends AT commands to the fax/modem 2 and thereby instructs the fax/modem 2 to execute sending or reception of a fax. The AT command execution analysis section 21 in the fax/modem 2 analyzes an AT commands sent from the computer unit 1 and executes the AT commands. The signal processing section 22 executes transmission of signals to the communication line or reception of signals from the communication line.

Figure 1:
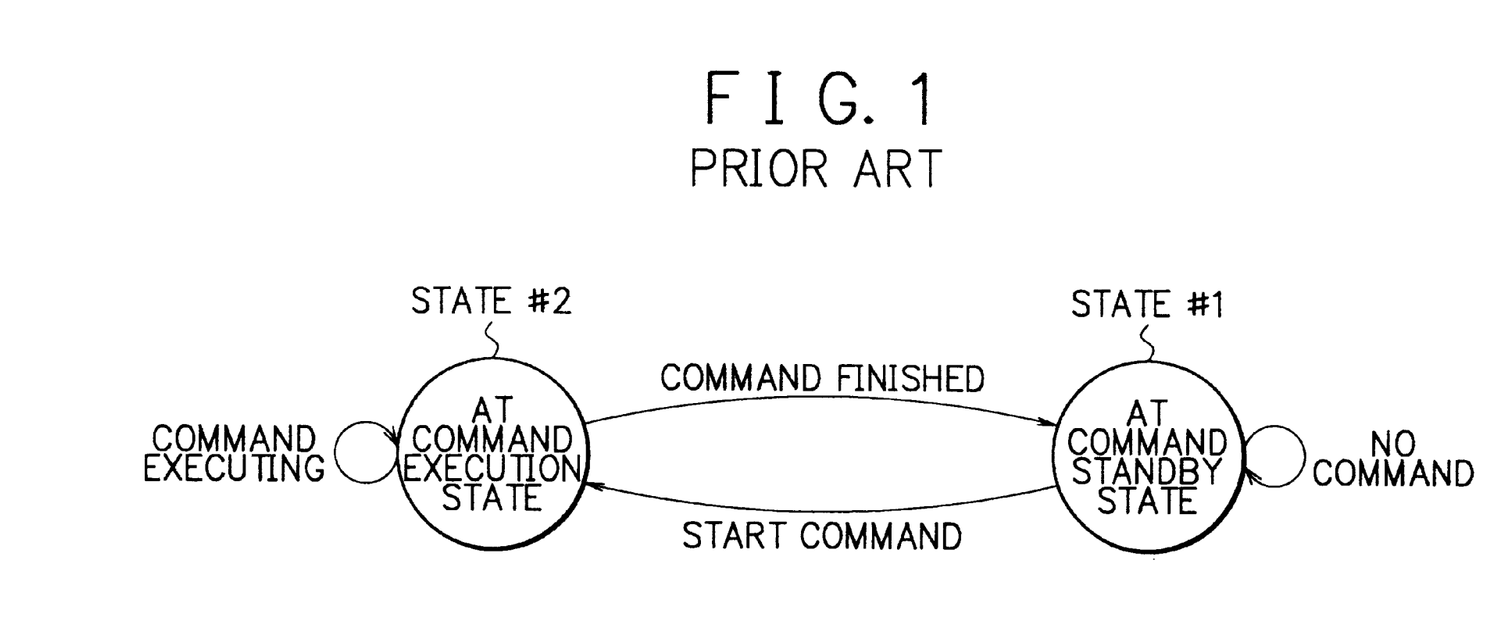
FIG. 1 is a schematic diagram showing changes of states of a fax/modem section in a conventional facsimile machine.

FIG. 1 is a schematic diagram showing changes of states of the fax/modem section in the conventional facsimile machine. Referring to FIG. 1, the internal state of the conventional fax/modem section can roughly be classified into an AT command standby state (state #1) in which the fax/modem section waits for supply of an AT command from the computer unit 1 and an AT command execution state (state #2) in which the fax/modem section executes an AT command. For example, the conventional fax/modem section is in the state #2 when the fax/modem section is receiving a DCS (Digital Command Signal) via the communication line, and changes into the state #1 (AT command standby state) after finishing reception of the DCS. After receiving an AT command (which instructs the fax/modem section to receive a TCF) from the computer unit 1, the conventional fax/modem section changes into the state #2 and executes a TCF reception process.

As described above, the internal state of the conventional fax/modem section includes the state #1 and the state #2, and the fax/modem section is in the state #1 or in the state #2 at a moment.

In the following, the operation for sending and receiving signals employed in the conventional facsimile machine and the conventional TCF reception method will be described referring to figures.

Figure 3:
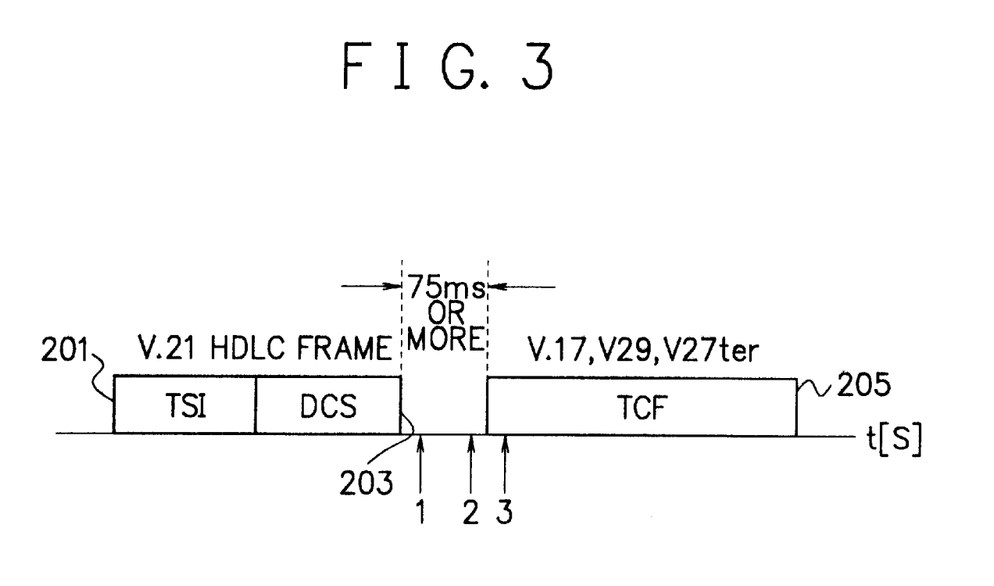
FIG. 3 is a timing chart showing an example of signals which are sent via the communication line and received by a fax/modem section of the facsimile machine.

FIG. 3 is a timing chart showing an example of signals which are sent via the communication line and received by the fax/modem 2. The signals shown in FIG. 3 are signals according to ITU-T T.30, including a TSI (Terminal System Identifier) 201, a DCS (Digital Command Signal) 203 and a TCF (Training Check Field) 205. The above acronyms will be used in the same meanings throughout the document and figures.

Figure 4:
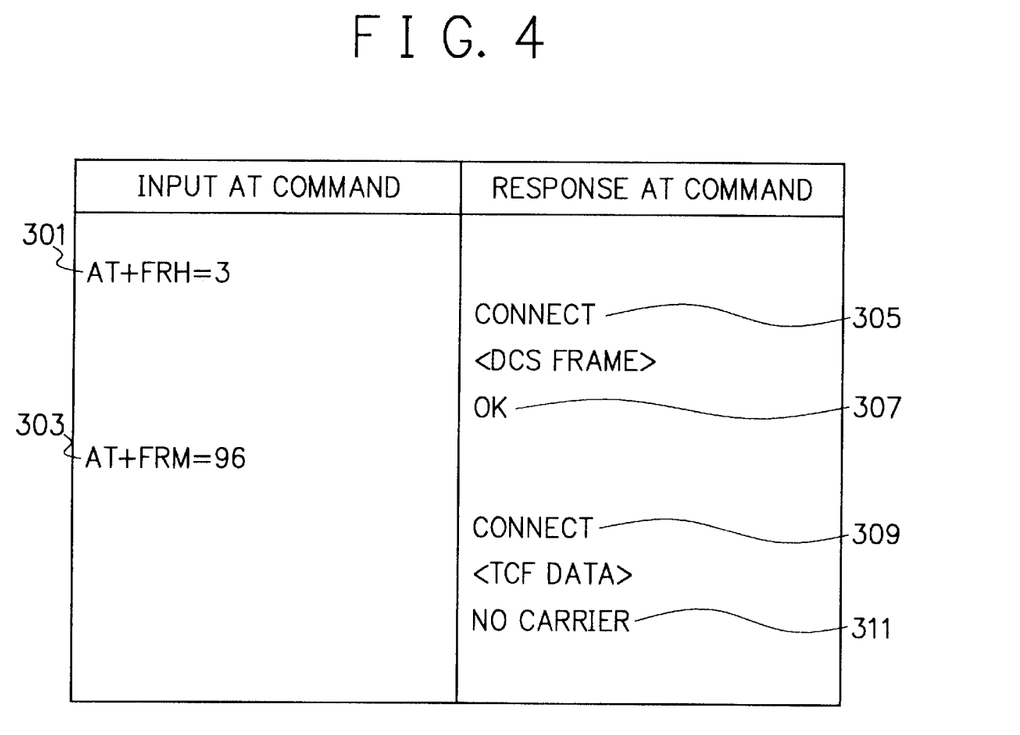
FIG. 4 is a schematic diagram showing an example of input AT commands and response AT commands which are received and transmitted by the fax/modem section.

When the signals shown in FIG. 3 are received by the fax/modem 2, commands and responses shown in FIG. 4 are communicated between the computer unit 1 and the fax/modem 2. FIG. 4 is a schematic diagram showing an example of input AT commands and response AT commands which are received and transmitted by the fax/modem 2.

Referring to FIG.4, the AT command "AT+FRH=3" (command 301) is a command for instructing the fax/modem 2 to receive an HDLC frame, and the AT command "AT+FRM=96" (command 303) is a command for instructing the fax/modem 2 to receive a TCF. Here, the HDLC frame is a frame according to HDLC (High Level Data Link Control Procedure).

In the example shown in FIG. 2, the AT commands sent from the computer unit 1 are received and accepted by the AT command execution analysis section 21 of the fax/modem 2. When the signal processing section 22 of the fax/modem 2 detected a carrier of the HDLC frame, the AT command execution analysis section 21 sends back a command 305 which means "CONNECT" to the computer unit 1 as a response to the command 301. After the signal processing section 22 received the HDLC frame, the AT command execution analysis section 21 sends the HDLC frame to the computer unit 1. When the signal processing section 22 detected end of data, the AT command execution analysis section 21 sends a command 307 which means "OK" to the computer unit 1. When the signal processing section 22 detected a carrier of the TCF, the AT command execution analysis section 21 sends back a command 309 which means "CONNECT " to the computer unit 1 as a response to the command 303. After the signal processing section 22 received the TCF, the AT command execution analysis section 21 sends the TCF to the computer unit 1.

When the signal processing section 22 detected end of data, the AT command execution analysis section 21 sends a command 311 which means "NO CARRIER" to the computer unit 1.

As described above, in the conventional facsimile machine and the conventional TCF reception method for a facsimile machine, the fax/modem 2 is supposed to execute transmission of signals to the communication line and reception of signals from the communication line correctly, by communicating AT commands with the computer unit 1.

However, there exist some types of facsimile machines whose switching time between the HDLC frame and the TCF (i.e. time interval between finishing sending the HDLC frame and starting sending the TCF) is almost the same as the minimum interval which is allowed in the ITU-T T.30.

In the case where such a facsimile machine sends the above signals to the conventional facsimile machine which employs the conventional TCF reception method (i.e. which operates as has been explained referring to FIG. 4), the conventional facsimile machine can not always establish communication with the facsimile machine, since the time interval is not enough.

Referring again to FIG. 4, the command 307 indicating a response "OK" to the command 301 ("AF+FRH=3": requesting reception of an HDLC frame) is transmitted by the fax/modem 2 to the computer unit 1 when the signal processing section 22 shown in FIG. 2 completed reception of the whole data of the HDLC frame.

Therefore, the command 307 indicating the response "OK" is transmitted by the fax/modem 2 to the computer unit 1 at the point "1" in the timing chart of FIG. 3.

When the computer unit 1 received the command 307 indicating the response "OK", the computer unit 1 sends the command 303 (the "AT+FRM=96" requesting reception of a TCF) to the fax/modem 2. The point "2" in the timing chart of FIG. 3 corresponds to the point when the command 303 is transmitted by the computer unit 1.

However, in the case where the facsimile machine (whose switching time between the HDLC frame and the TCF is very short) sent the signals to the conventional facsimile machine, the point when the command 303 is transmitted by the computer unit 1 comes to the point "3" in FIG. 3 due to the short switching time.

In such cases, the command 303 reaches the fax/modem 2 after arrival of the front end of the TCF, and thus the fax/modem 2 can not receive the TCF correctly.

In the ITU-T T.30, the switching time between the HDLC frame and the TCF is required to be 75 ms or more. Therefore, in order to let the fax/modem 2 always receive the TCF correctly, the computer unit 1 in FIG. 2 is required to output the command 303 (the "AT+FRM=96" requesting reception of a TCF) 75 ms or less after the reception of the command 307 indicating the response "OK".

However, as a matter of fact, it is very difficult to reduce the time interval between reception of the command 307 and sending of the command 303 to less than 75 ms, because of efficiency of the computer unit 1 and the interface between the computer unit 1 and the fax/modem 2.

Therefore, the conventional facsimile machine and the conventional TCF reception method for a facsimile machine involve a problem of being unable to establish communication with the facsimile machines whose switching time between the HDLC frame and the TCF is very short, by missing the front end of the TCF.

SUMMARY OF THE INVENTION

It is therefore the primary object of the present invention to provide a facsimile machine, by which a TCF (Training Check Field) following a DCS (Digital Command Signal) of an HDLC frame can be received with reliability, and thereby establishment of communication is ensured and communication reliability is secured.

Another object of the present invention is to provide a TCF reception method for a facsimile machine, by which a TCF (Training Check Field) following a DCS (Digital Command Signal) of an HDLC frame can be received with reliability, and thereby establishment of communication is ensured and communication reliability is secured.

In accordance with a first aspect of the present invention, there is provided a facsimile machine for sending and receiving a fax comprising a fax/modem means. The fax/modem means changes into a state for receiving a TCF (Training Check Field) if the fax/modem means received a DCS (Digital Command Signal), regardless of whether or not the fax/modem means has already received a TCF reception command.

In accordance with a second aspect of the present invention, there is provided a facsimile machine for sending and receiving a fax, comprising a fax/modem means for communicating signals with a communication line in order to sending and receiving a fax and an AT command output means for outputting AT commands such as a DCS reception command for requesting reception of a DCS (Digital Command Signal) and a TCF reception command for requesting reception of a TCF (Training Check Field) to the fax/modem means. The fax/modem means changes into a state for receiving a TCF if the fax/modem means received a DCS, regardless of whether or not the fax/modem means has already received the TCF reception command from the AT command output means.

In accordance with a third aspect of the present invention, in the second aspect, the internal states of the fax/modem means includes an AT command standby state, an AT command execution state and an AT command provisional execution state. In the AT command standby state, the fax/modem means waits for supply of an AT command from the AT command output means. In the AT command execution state, the fax/modem means executes an AT command. The fax/modem means changes into the AT command provisional execution state as the state for receiving a TCF, just after receiving a DCS. In the AT command provisional execution state, the fax/modem means receives the TCF.

In accordance with a fourth aspect of the present invention, in the third aspect, the fax/modem means includes a TCF storage means for temporarily storing the TCF which is received in the AT command provisional execution state.

In accordance with a fifth aspect of the present invention, in the third aspect, the fax/modem means resets a timer which counts the duration of the AT command provisional execution state, when the fax/modem means received the DCS.

In accordance with a sixth aspect of the present invention, in the fourth aspect, the fax/modem means deletes the TCF stored in the TCF storage means when the fax/modem means received the DCS.

In accordance with a seventh aspect of the present invention, in the fourth aspect, the fax/modem means refers to a timer which counts the duration of the AT command provisional execution state in the AT command provisional execution state. The fax/modem means deletes the TCF stored in the TCF storage means and changes into the AT command standby state if the duration of the AT command provisional execution state has reached a predetermined length.

In accordance with an eighth aspect of the present invention, in the fourth aspect, the fax/modem means judges whether or not the TCF storage means is overflowing in the AT command provisional execution state. The fax/modem means deletes the TCF stored in the TCF storage means and changes into the AT command standby state if the TCF storage means is overflowing.

In accordance with a ninth aspect of the present invention, in the fourth aspect, the TCF stored in the TCF storage means is outputted to the AT command output means after the fax/modem means received the TCF reception command from the AT command output means.

In accordance with a tenth aspect of the present invention, there is provided a TCF reception method for a facsimile machine provided with a fax/modem means. The method comprises a TCF reception state transition step. In the TCF reception state transition step, the fax/modem means is changed into a state for receiving a TCF (Training Check Field) if the fax/modem means received a DCS (Digital Command Signal) regardless of whether or not the fax/modem means has already received a TCF reception command.

In accordance with an eleventh aspect of the present invention, there is provided a TCF reception method for a facsimile machine which is provided with a fax/modem means for communicating signals with a communication line in order to sending and receiving a fax and an AT command output means for outputting AT commands such as a DCS reception command for requesting reception of a DCS (Digital Command Signal) and a TCF reception command for requesting reception of a TCF (Training Check Field) to the fax/modem means. The method comprises a TCF reception state transition step. In the TCF reception state transition step, the fax/modem means is changed into a state for receiving a TCF if the fax/modem means received a DCS regardless of whether or not the fax/modem means has already received a TCF reception command from the AT command output means.

In accordance with a twelfth aspect of the present invention, in the eleventh aspect, the internal states of the fax/modem means includes an AT command standby state, an AT command execution state and an AT command provisional execution state. In the AT command standby state, the fax/modem means waits for supply of an AT command from the AT command output means. In the AT command execution state, the fax/modem means executes an AT command. The fax/modem means changes into the AT command provisional execution state as the state for receiving a TCF, just after receiving a DCS. In the AT command provisional execution state, the fax/modem means receives the TCF.

In accordance with a thirteenth aspect of the present invention, in the twelfth aspect, the method further comprises a TCF storage step in which the TCF received in the AT command provisional execution state is stored in a TCF storage means.

In accordance with a fourteenth aspect of the present invention, in the twelfth aspect, the method further comprises a timer reset step in which a timer which counts the duration of the AT command provisional execution state is reset when the fax/modem means received the DCS.

In accordance with a fifteenth aspect of the present invention, in the thirteenth aspect, the method further comprises a TCF deletion step in which the TCF stored in the TCF storage means is deleted when the fax/modem means received the DCS.

In accordance with a sixteenth aspect of the present invention, in the thirteenth aspect, the method further comprises a timer check step and a first deletion transition step. In the timer check step, the fax/modem means refers to a timer which counts the duration of the AT command provisional execution state and thereby checks the duration of the AT command provisional execution state. In the first deletion transition step, the TCF stored in the TCF storage means is deleted and the fax/modem means is changed into the AT command standby state if the duration of the AT command provisional execution state has reached a predetermined length in the timer check step.

In accordance with a seventeenth aspect of the present invention, in the thirteenth aspect, the method further comprises a TCF overflow check step and a second deletion transition step. In the TCF overflow check step, the fax/modem means checks whether or not the TCF storage means is overflowing. In the second deletion transition step, the TCF stored in the TCF storage means is deleted and the fax/modem means is changed into the AT command standby state if the TCF storage means is overflowing in the TCF overflow check step.

In accordance with an eighteenth aspect of the present invention, in the thirteenth aspect, the TCF stored in the TCF storage means is outputted to the AT command output means after the fax/modem means received the TCF reception command from the AT command output means.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Referring now to the drawings, a description will be given in detail of preferred embodiments in accordance with the present invention.

FIG. 2 is a schematic block diagram showing a facsimile machine according to an embodiment of the present invention. A TCF reception method for a facsimile machine according to the present invention is employed by the facsimile machine of FIG. 2.

Referring to FIG. 2, the facsimile machine is composed of a computer unit 1 which operates according to control of a programs and outputs AT commands, and a fax/modem 2 which is connected to a communication line. The computer unit 1 sends AT commands to the fax/modem 2 and thereby instructs the fax/modem 2 to execute sending or reception of a fax. The computer unit 1 also receives responses from the fax/modem 2.

The fax/modem 2 includes an AT command execution analysis section 21 and a signal processing section 22 in the same way as the prior art. The AT command execution analysis section 21 analyzes AT commands sent from the computer unit 1 and executes the AT commands. The signal processing section 22 executes transmission of signals to the communication line or reception of signals from the communication line. The AT command execution analysis section 21 and the signal processing section 22 are realized by, for example, one or more microprocessor units which are composed of one or more CPUs (Central Processing Units), ROM (Read Only Memory), RAM (Random Access Memory), etc. The fax/modem 2 further includes an unshown TCF buffer for temporarily storing a TCF, as will be described later.

Incidentally, while the computer unit 1 and the fax/modem 2 are provided apart in FIG. 2, of course the computer unit 1 and the fax/modem 2 can also be installed in one body as an integral-type facsimile machine. In addition, while the hardware fax/modem 2 is employed as the fax/modem section of the facsimile machine in FIG. 2, the fax/modem section is not limited to such a hardware fax/modem section and it is also possible to realize the fax/modem 2 by software that is installed on a computer (for example, the computer unit 1) and executed by a CPU of the computer.

In the case where the fax/modem 2 is realized by hardware, the computer unit 1 and the fax/modem 2 are connected together via an RS-232C serial interface and an RS-232C cable, for example. In the case where the computer unit 1 and the hardware fax/modem 2 are installed in one body as an integral-type facsimile machine, the computer unit 1 and the fax/modem 2 are connected together by bus, for example.

Figure 5:
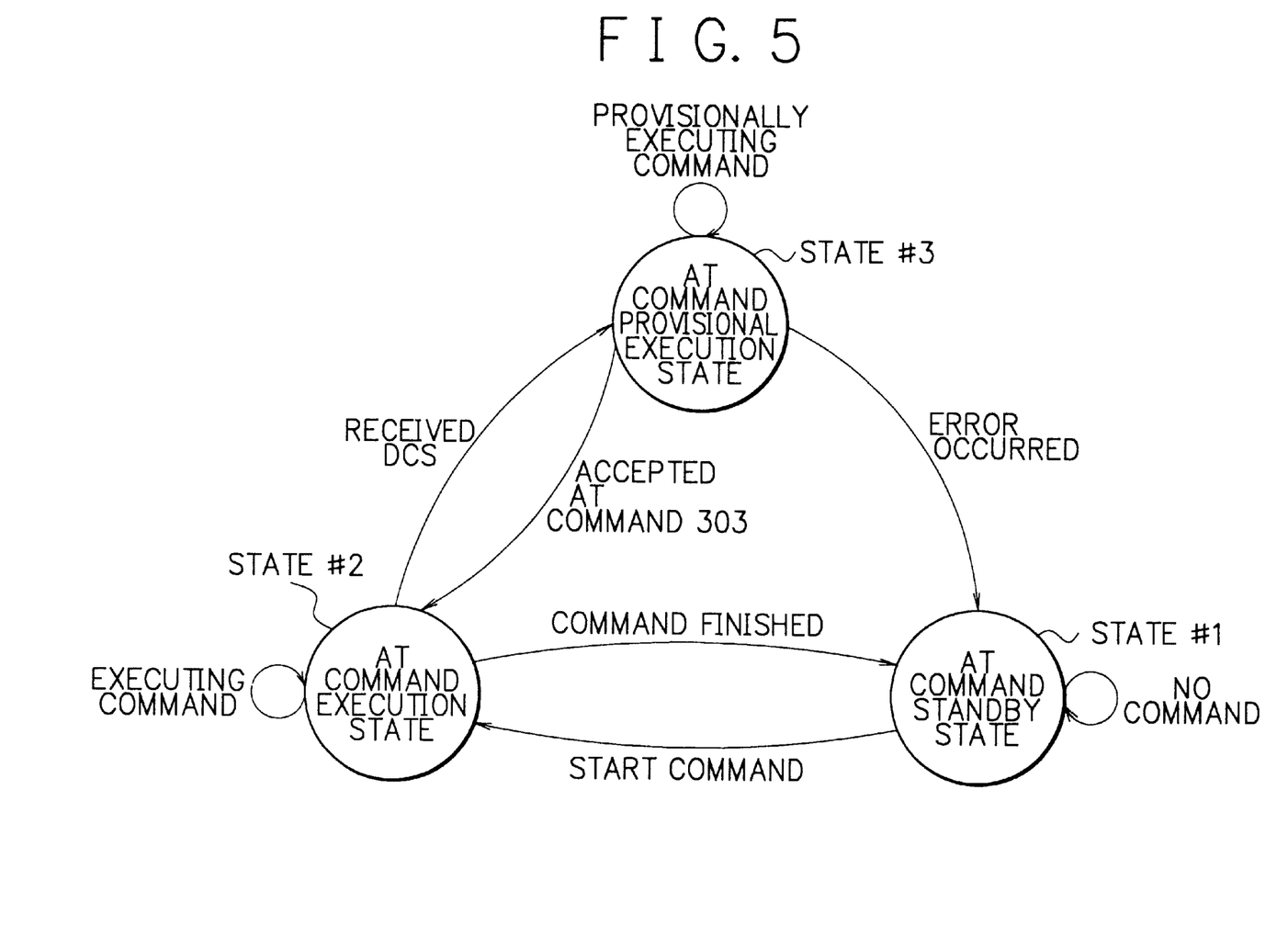
FIG. 5 is a schematic diagram showing an example of changes of states of the fax/modem section.

In the following, changes of states of the fax/modem 2 will be described referring to FIG. 5. FIG. 5 is a schematic diagram showing an example of changes of states of the fax/modem 2. Referring to FIG. 5, the internal states of the fax/modem 2 in this embodiment includes an AT command standby state (state #1) and an AT command execution state (state #2) in the same way as the prior art.

The internal states of the fax/modem 2 in this embodiment further includes an AT command provisional execution state (state #3).

The state #1 is a state in which the fax/modem 2 waits for supply of an AT command from the computer unit 1, and the state #2 is a state in which the fax/modem 2 executes an AT command. The state #3 is a state into which the fax/modem 2 changes just after receiving a DCS and in which the fax/modem 2 preliminarily receives the following TCF.

As shown in FIG. 5, change from the state #1 to the state #2 occurs when the fax/modem 2 received an AT command, and change from the state #2 to the state #3 occurs when the fax/modem 2 received a DCS. Change from the state #3 to the state #1 occurs when an error occurred. Change from the state #3 to the state #2 occurs when the fax/modem 2 received and accepted a TCF reception command (i.e. the command 303 "AT+FRM=96") from the computer unit 1, and change from the state #2 to the state #1 occurs when execution of an AT command is completed.

In the following, the operation of the facsimile machine and the TCF reception method according to the embodiment of the present invention will be described in detail referring to FIG. 5 through FIG. 7.

Figure 6:
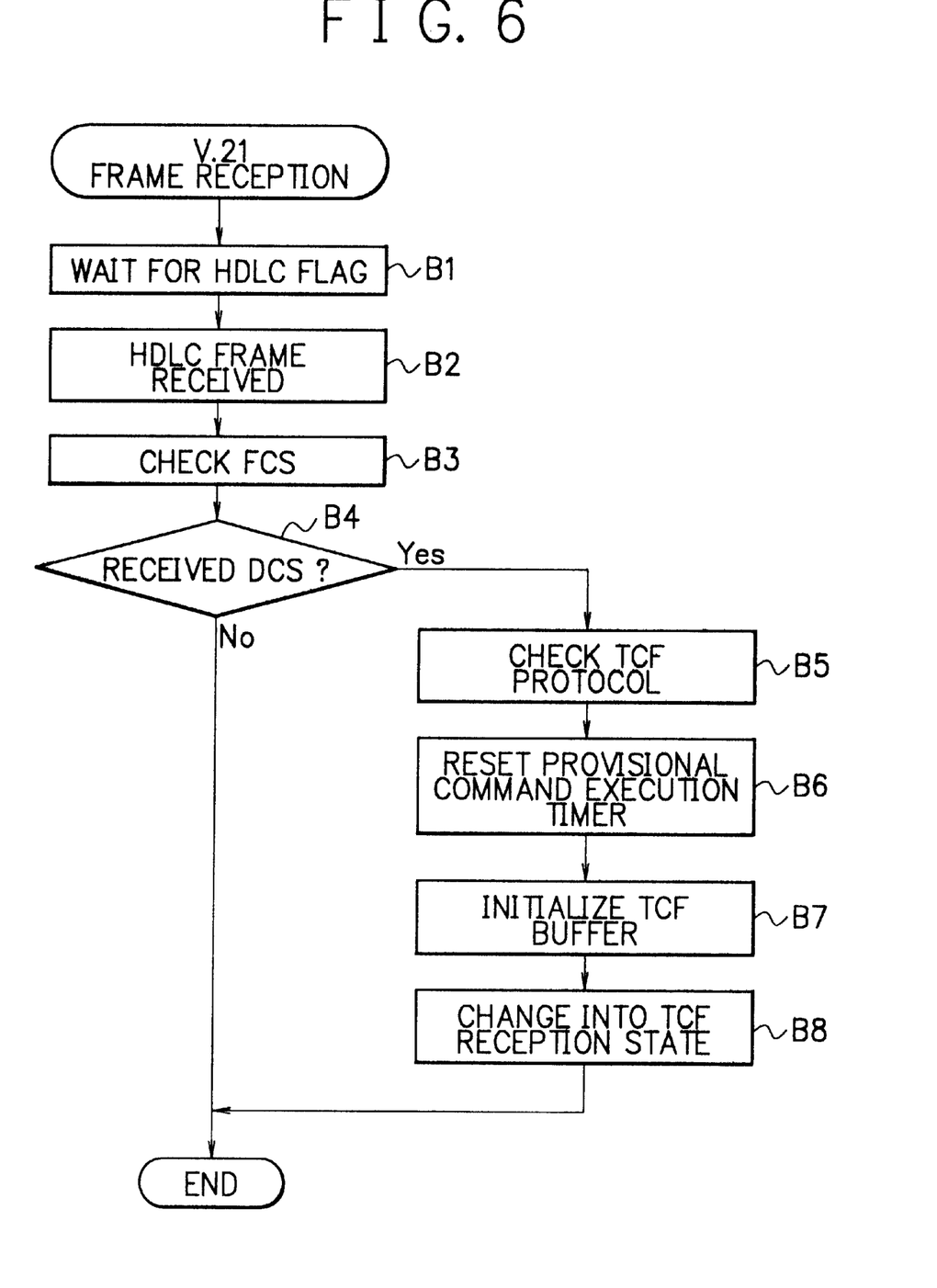
FIG. 6 is a flow chart showing an example of the operation of the fax/modem section in the case where the fax/modem section is in a state #2 shown in FIG. 5.
Figure 7:
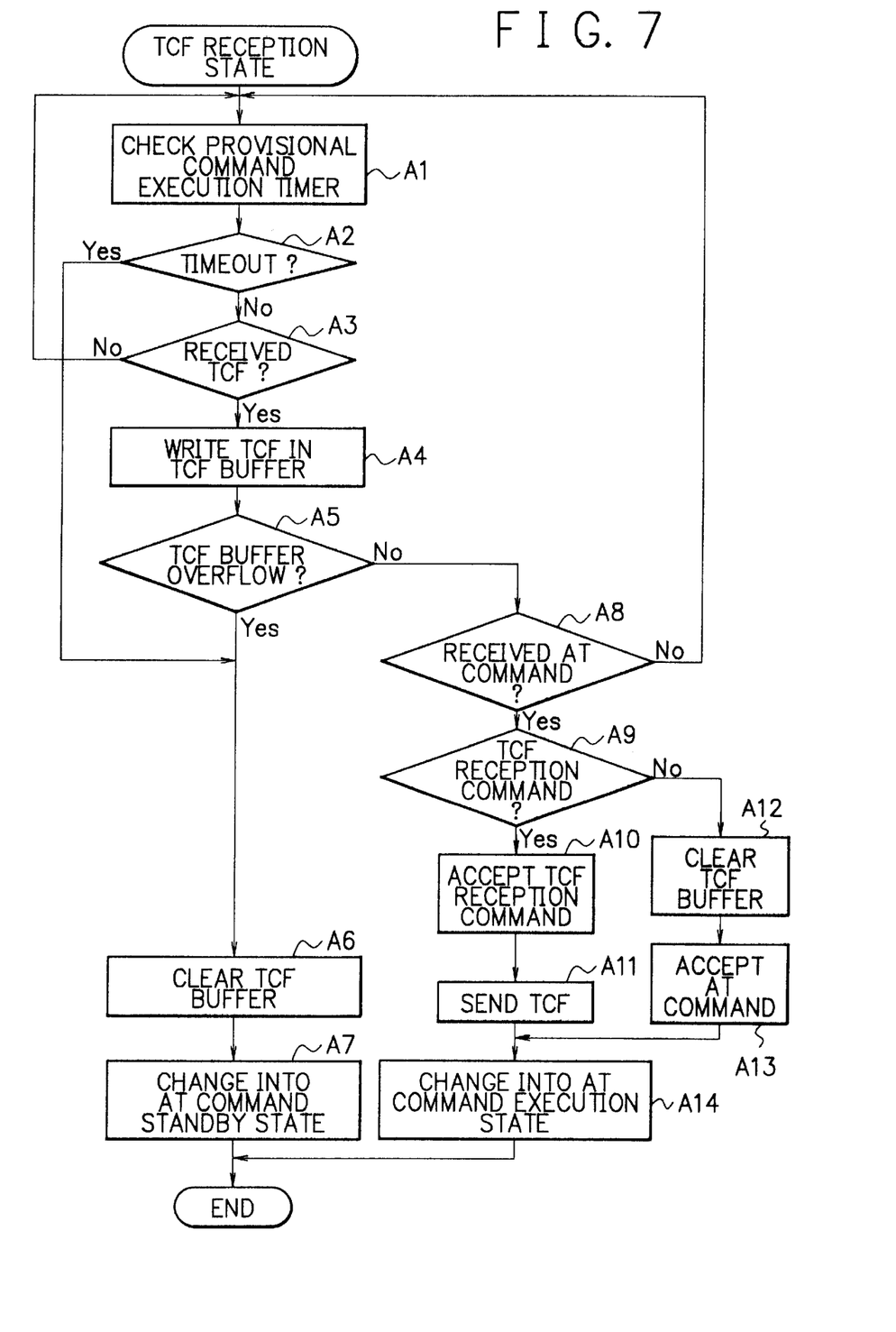
FIG. 7 is a flow chart showing an example of the operation of the fax/modem section in the case where the fax/modem section is in the state #3 shown in FIG. 5.

FIG. 6 is a flow chart showing an example of the operation of the fax/modem 2 in the case where the fax/modem 2 is in the state #2, and FIG. 7 is a flow chart showing an example of the operation of the fax/modem 2 in the case where the fax/modem 2 is in the state #3.

As mentioned above, the change from the state #2 to the state #3 occurs when the fax/modem 2 received a DCS. First, the change from the state #2 to the state #3 will be explained referring to FIG. 6.

In step B1, the fax/modem 2 in the state #2 waits for an HDLC flag. In step B2, the fax/modem 2 receives an HDLC frame, and checks a FCS (Frame Check Sequence) of the HDLC frame (step B3). When reception of the HDLC frame is finished, the fax/modem 2 judges whether the received HDLC frame is a DCS or not (step B4).

In the case where the frame is not a DCS frame in the step B4 (No), the fax/modem 2 ends the execution of the AT command 301 "AT+FRH=3" normally, and then changes into the state #1.

In the case where the frame is a DCS frame in the step B4 (Yes), the fax/modem 2 checks the protocol of the TCF to be received by referring to the DCS (step B5), resets a provisional execution state timer (step B6), deletes a TCF which has been stored in the TCF buffer (i.e. initializes the TCF buffer of the fax/modem 2) (step B7), and changes into a TCF reception state (i.e. the AT command provisional execution state (state #3) shown in FIG. 5) (step B8).

Next, the operation of the fax/modem 2 in the state #3 will be explained referring to FIG. 5 and FIG. 7. After changing into the state #3, the fax/modem 2 immediately starts a process for receiving the TCF. Concretely, the fax/modem 2 executes reception of the TCF according to the flow chart of FIG. 7, for example.

First, the fax/modem 2 checks the provisional execution state timer (step A1). The provisional execution state timer counts elapsed time since the fax/modem 2 changed into the state #3 (the AT command provisional execution state). The provisional execution state timer is provided in order to forcibly change the fax/modem 2 into the state #1 in case where the fax/modem 2 still remains in the state #3 even if a predetermined time has elapsed. Incidentally, the provisional execution state timer has been reset in the step B6 of FIG. 6.

In step A2, the fax/modem 2 judges whether or not the time-out period has passed. If the provisional execution state timer has counted to the time-out period ("Yes" in the step A2), the process proceeds to step A6 and the fax/modem 2 clears the TCF buffer (i.e. deletes a TCF in the TCF buffer), and then changes into the AT command standby state (i.e. the state #1 of FIG. 5) (step A7).

If the provisional execution state timer has not counted to the time-out period ("No" in the step A2), the process proceeds to the following step A3 and the fax/modem 2 judges whether or not a TCF has been received by the signal processing section 22.

If no TCF has been received ("No" in the step A3), the process is returned to the step A1 and the process from the step A1 is repeated.

If a TCF has been received ("Yes" in the step A3), the process proceeds to the following step A4 and the fax/modem 2 stores the TCF in the TCF buffer (i.e. writes data of the TCF in the TCF buffer). Subsequently, the fax/modem 2 judges whether or not the TCF buffer is overflowing (step A5). Incidentally, the "overflow" means that a TCF whose size is larger than the capacity of the TCF buffer has been received by the signal processing section 22 (that is, an illegal TCF has been sent from the sender). If the TCF buffer is overflowing ("Yes" in the step A5), the process proceeds to the next step A6 and the fax/modem 2 clears the TCF buffer, and then changes into the AT command standby state (i.e. changes into the state #1 as an abnormal end) (step A7).

If the TCF buffer is not overflowing ("No" in the step A5), the process proceeds to step A8 and the fax/modem 2 checks whether or not an AT command from the computer unit 1 has been received by the AT command execution analysis section 21. If no AT command has been received ("No" in the step A8), the process is returned to the step A1 and the process from the step A1 is repeated.

If a AT command has been received ("Yes" in the step A8), the process proceeds to the next step A9 and the fax/modem 2 judges whether or not the AT command is a TCF reception command instructing the fax/modem 2 to receive a TCF (i.e. the command 303 "AT+FRM=96" shown in FIG. 4).

If the AT command is a TCF reception command ("Yes" in the step A9), the fax/modem 2 accepts the AT command (step A10) and sends the TCF which has been stored in the TCF buffer to the computer unit 1 (step A11). After the step A11 has been completed, the fax/modem 2 executes a procedure for changing its state from the state #3 to the state #2, and changes into the state #2 (step A14).

If the AT command is not a TCF reception command ("No" in the step A9), the fax/modem 2 clears the TCF buffer (step A12) and accepts the AT command which is not the TCF reception command (step A13). Then, the fax/modem 2 executes a procedure for changing its state from the state #3 to the state #2, and changes into the state #2 (step A14). Thereafter, the fax/modem 2 continues execution of the AT command in the state #2.

As described above, in the facsimile machine and the TCF reception method for a facsimile machine according to the embodiment of the present invention, if the fax/modem 2 received a DCS in the state #2 (i.e. the AT command execution state), the fax/modem 2 immediately changes into the state #3 (i.e. the AT command provisional execution state). In the state #3, the fax/modem 2 receives the TCF sent via the communication line and temporarily stores the TCF in the TCF buffer regardless of whether or not the TCF reception command (i.e. the command 303 "AT+FRM=96") from the computer unit 1 has been received by the AT command execution analysis section 21, and sends the TCF in the TCF buffer to the computer unit 1 when the AT command execution analysis section 21 received the TCF reception command from the computer unit 1. Therefore, even in the case where the computer unit 1 transmitted the TCF reception command to the fax/modem 2 slowly in comparison with the switching time of the sender facsimile machine between the HDLC frame and the TCF, the TCF via the communication line can be received by the fax/modem 2 correctly, and thereby communication with the sender facsimile machine can be established with reliability.

Incidentally, as mentioned before, while the computer unit 1 and the fax/modem 2 are provided apart in FIG. 2, the present invention can also be applied to the case where the computer unit 1 and the fax/modem 2 are installed in one body as an integral-type facsimile machine. The fax/modem 2 is not limited to a hardware fax/modem 2 and it is also possible to realize the fax/modem 2 by software that is installed on a computer (for example, the computer unit 1) and executed by a CPU of the computer.

As set forth hereinabove, by the facsimile machine and the TCF reception method for a facsimile machine according to the present invention, communication with other facsimile machines can be established with reliability even if the switching time of the sender facsimile machine between the HDLC frame and the TCF is very short, and thus communication reliability between facsimile machines can be improved.

The facsimile machine and the TCF reception method for a facsimile machine according to the present invention are realized by simply adding a state of the fax/modem 2 (i.e. the AT command provisional execution state (state #3)) and a buffer (i.e. the TCF buffer), and thus it is unnecessary to employ modules having increased processing speed or high speed interfaces between the modules in the facsimile machine in order to reduce the time interval between the command 307 and the command 303. Therefore, the above effects of the present invention can be attained with little increase of manufacturing cost of the facsimile machine.

Further, in the case where the fax/modem section of the facsimile machine is realized by software which is executed by a CPU of the facsimile machine, variations in the load on the CPU generally becomes larger in comparison with the case where a hardware fax/modem section is employed, and thus the time interval between the command 307 and the command 303 sometimes becomes very long. However, according to the present invention, the TCF can be received without error even if the time interval gets longer. Therefore, the present invention is effective for improving communication reliability, especially in the case where a processor executes modem protocol processing along with executing an operating system, application software, etc.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A facsimile machine for sending and receiving a fax comprising a fax/modem means, wherein the fax/modem means changes into a state for receiving a TCF (Training Check Field) if the fax/modem means receives a DCS (Digital Command Signal), regardless of whether the fax/modem means has already received a TCF reception command from a computer unit.

2. A facsimile machine for sending and receiving a fax, comprising:

a fax/modem means for communicating signals with a communication line to send and receive a fax; and an AT command output means for outputting AT commands, including a DCS reception command for requesting reception of a DCS (Digital Command Signal) and a TCF reception command for requesting reception of a TCF (Training Check Field), to the fax/modem means, wherein the fax/modem means changes into a state for receiving a TCF if the fax/modem means received a DCS, regardless of whether the fax/modem means has already received a TCF reception command from the AT command output means.

3. A facsimile machine for sending and receiving a fax, comprising:

a fax/modem means for communicating signals with a communication line to send and receive a fax; and an AT command output means for outputting AT commands, including a DCS reception command for requesting reception of a DCS (Digital Command Signal) and a TCF reception command for requesting reception of a TCF (Training Check Field), to the fax/modem means;

an AT command standby state in which the fax/modem means waits for supply of an AT command from the AT command output means;

an AT command execution state in which the fax/modem means executes an AT command; and an AT command provisional execution state as a state for receiving a TCF, into which the fax/modem means changes just after receiving a DCS, regardless of whether the fax/modem means has already received a TCF reception command from the AT command output means, and in which the fax/modem means receives the TCF.

4. A facsimile machine as claimed in claim 3, wherein the fax/modem means resets a timer which counts the duration of the AT command provisional execution state, when the fax/modem means received the DCS.

5. A facsimile machine as claimed in claim 3, wherein the fax/modem means includes a TCF storage means for temporarily storing the TCF which is received in the AT command provisional execution state.

6. A facsimile machine as claimed in claim 5, wherein the fax/modem means deletes the TCF stored in the TCF storage means when the fax/modem means received the DCS.

7. A facsimile machine as claimed in claim 5, wherein in the AT command provisional execution state, the fax/modem means refers to a timer which counts the duration of the AT command provisional execution state, and deletes the TCF stored in the TCF storage means and changes into the AT command standby state if the duration of the AT command provisional execution state has reached a predetermined length.

8. A facsimile machine as claimed in claim 5, wherein in the AT command provisional execution state, the fax/modem means judges whether or not the TCF storage means is overflowing, and deletes the TCF stored in the TCF storage means and changes into the AT command standby state if the TCF storage means is overflowing.

9. A facsimile machine as claimed in claim 5, wherein the TCF stored in the TCF storage means is outputted to the AT command output means after the fax/modem means received the TCF reception command from the AT command output means.

10. A TCF reception method for a facsimile machine provided with a fax/modem means, comprising a TCF reception state transition step in which the fax/modem means is changed into a state for receiving a TCF (Training Check Field) if the fax/modem means received a DCS (Digital Command Signal) regardless of whether the fax/modem means has already received a TCF reception command from a computer unit.

11. A TCF reception method for a facsimile machine which is provided with a fax/modem means for communicating signals with a communication line to send and receive a fax and an AT command output means for outputting AT commands including a DCS reception command for requesting reception of a DCS (Digital Command Signal) and a TCF reception commend for requesting reception of a TCF (Training Check Field) to the fax/modem means, comprising a TCF reception state transition step in which the fax/modem means is changed into a state for receiving a TCF if the fax/modem means received a DCS regardless of whether the fax/modem means has already received a TCF reception command from the AT command output means.

12. A TCF reception method for a facsimile machine that has a fax/modem means for communicating signals with a communication line to send and receive a fax and an AT command output means for outputting AT commands including a DCS reception command for requesting a DCS (Digital Command Signal) and a TCF reception commend for requesting reception of a TCF (Training Check Field) to the fax/modem means, comprising:

changing an internal fax/modem state to an AT command standby state in which the fax/modem means waits for supply of an AT command from the AT command output means;

changing an internal fax/modem state to an AT command execution state in which the fax/modem means executes an AT command; and changing an internal fax/modem state to an AT command provisional execution state as a state for receiving a TCF, just after receiving a DCS, regardless of whether the fax/modem means has already received a TCF reception command from the AT command output means, and in which the fax/modem means receives a TCF.

13. A TCF reception method as claimed in claim 12, further comprising a timer reset step in which a timer which counts the duration of the AT command provisional execution state is reset when the fax/modem means received the DCS.

14. A TCF reception method as claimed in claim 12, further comprising a TCF storage step in which the TCF received in the AT command provisional execution state is stored in a TCF storage means.

15. A TCF reception method as claimed in claim 14, further comprising a TCF deletion step in which the TCF stored in the TCF storage means is deleted when the fax/modem means received the DCS.

16. A TCF reception method as claimed in claim 14, further comprising:

a timer check step in which the fax/modem means refers to a timer which counts the duration of the AT command provisional execution state and thereby checks the duration of the AT command provisional execution state: and a first deletion transition step in which the TCF stored in the TCF storage means is deleted and the fax/modem means is changed into the AT command standby state if the duration of the AT command provisional execution state has reached a predetermined length in the timer check step.

17. A TCF reception method as claims in claim 14, further comprising:

a TCF overflow check step in which the fax/modem means checks whether the TCF storage means is overflowing; and a second deletion transition step in which the TCF stored in the TCF storage means is deleted and the fax/modem means is changed into the AT command standby state if the TCF storage means is overflowing in the TCF overflow check step.

18. A TCF reception method as claimed in claim 14, wherein the TCF stored in the TCF storage means is outputted to the AT command output means after the fax/modem means received the TCF reception command from the AT command output means.

19. A facsimile machine for sending and receiving a fax comprising a fax/modem device, wherein the fax/modem device changes into a state for receiving a TCF (Training Check Field) if the fax/modem device receives a DCS (Digital Command Signal), regardless of whether the fax/modem device has already received at TCF reception command from a computer unit.

20. A facsimile machine for sending and receiving a fax, comprising:

a fax/modem device for communicating signals with a communication line to send and receive a fax; and an AT command output device for outputting AT commands, including a DCS reception command for requesting reception of a DCS (Digital Command Signal) and a TCF reception command for requesting reception of a TCF (Training Check Field), to the fax/modem device, wherein the fax/modem device changes into a state for receiving a TCF if the fax/modem device receives a DCS, regardless of whether the fax/modem device has already received a TCF reception command from the AT command output device.

21. A TCF reception method for a facsimile machine provided with a fax/modem device, comprising a TCF reception state transition step in which the fax/modem device is changed into a state for receiving a TCF (Training Check Field) if the fax/modem device receives a DCS (Digital Command Signal) regardless of whether the fax/modem device has already received a TCF reception command from a computer unit.

22. A TCF reception method for a facsimile machine which is provided with a fax/modem device for communicating signals with a communication line to send and receive a fax and an AT command output device for outputting AT commands including a DCS reception command for requesting reception of a DCS (Digital Command Signal) and a TCF reception command for requesting reception of a TCF (Training Check Field) to the fax/modem device, comprising a TCF reception state transition step in which the fax/modem device is changed into a state for receiving a TCF if the fax/modem device receives a DCS regardless of whether the fax/modem device has already received a TCF reception command from the AT command output device.

* * * * *